US006991113B2

(12) United States Patent
Nakajima

(10) Patent No.: US 6,991,113 B2
(45) Date of Patent: Jan. 31, 2006

(54) NONWOVEN FABRIC FOR FILTER AND FILTER FOR ENGINE

(75) Inventor: Hiroyuki Nakajima, Ritto (JP)

(73) Assignees: Kureha Ltd., Shiga (JP); Toyoda Boshoku Corporation, Aichi (JP)

( * ) Notice: Subject to any disclaimer, the term of this patent is extended or adjusted under 35 U.S.C. 154(b) by 223 days.

(21) Appl. No.: 10/160,156

(22) Filed: Jun. 4, 2002

(65) Prior Publication Data

US 2003/0222014 A1    Dec. 4, 2003

(51) Int. Cl.
*B32B 31/14*    (2006.01)

(52) U.S. Cl. .................... 210/491; 156/148; 156/282

(58) Field of Classification Search ........ 210/488–491, 210/505, 508; 156/583.1, 148, 278, 282
See application file for complete search history.

(56) References Cited

U.S. PATENT DOCUMENTS

| 3,592,767 | A |   | 7/1971  | Pall                          |
|-----------|---|---|---------|-------------------------------|
| 4,093,437 | A | * | 6/1978  | Ichihara et al. ........ 55/487 |
| 4,211,661 | A | * | 7/1980  | Perry ................ 210/491  |
| 4,340,563 | A | * | 7/1982  | Appel et al. ........... 264/518 |
| 4,795,559 | A | * | 1/1989  | Shinjou et al. ........ 210/490 |
| 5,130,134 | A | * | 7/1992  | Noddin et al. .......... 442/57 |
| 5,175,042 | A | * | 12/1992 | Chomarat ............. 428/139  |
| 5,246,772 | A | * | 9/1993  | Manning .............. 442/364  |
| 5,486,411 | A |   | 1/1996  | Hassenboehler, Jr. et al.     |
| 5,609,947 | A | * | 3/1997  | Kamei et al. ......... 428/212 |
| 5,614,095 | A | * | 3/1997  | Degen et al. .......... 210/491 |
| 5,665,235 | A | * | 9/1997  | Gildersleeve et al. ... 210/503 |
| 5,709,735 | A | * | 1/1998  | Midkiff et al. ......... 96/17  |
| 6,267,252 | B1 | * | 7/2001 | Amsler ............... 210/490  |
| 2002/0139744 | A1 | * | 10/2002 | Choi ................ 210/491 |

FOREIGN PATENT DOCUMENTS

| EP | 0 626 187 | 11/1994 |
| JP | 50-31476  | 3/1975  |
| JP | 8-309136  | 11/1996 |
| JP | 9-192427  | 7/1997  |

* cited by examiner

*Primary Examiner*—Terry K. Cecil
(74) *Attorney, Agent, or Firm*—Wenderoth, Lind & Ponack, L.L.P.

(57) ABSTRACT

A nonwoven fabric for a filter excellent in cleaning efficiency and trapped matter retention volume is constructed by two or more different kinds of fibrous layers placed one over the other. The nonwoven fabric has an average pore size from 30 $\mu$m inclusive to 60 $\mu$m inclusive and a total pore area at 0.011 $cm^2/cm^2$ or more with respect to an entire surface of the nonwoven fabric. The average pore size is calculated according to a bubble point method as defined in ASTM F-316-80 with use of a Coulter Porometer II.

6 Claims, No Drawings

NONWOVEN FABRIC FOR FILTER AND FILTER FOR ENGINE

BACKGROUND OF THE INVENTION

1. Field of the Invention

This invention relates to nonwoven fabrics for filters adapted for separating and removing dusts in the air, etc., and more particularly to nonwoven fabrics for filters excellent in retention volume of trapped matters such as dusts and carbon particles and capable of maintaining high cleaning efficiency for a long term, a process for manufacturing such nonwoven fabrics, and filters using such nonwoven fabrics.

2. Description of the Related Art

Heretofore, there has been customarily used a method for allowing air containing dusts, etc. to pass through filters for removal of the dusts, etc., as a method for providing clean air. Performance required for filters differs depending on what the filters are used for. In view of this, a variety of materials such as paper and fibers are used as materials for filters. In case that filters are used for air-intake engines of automotive vehicles, the ability of keeping high cleaning efficiency as well as attaining high cleaning efficiency is required.

Recently, nonwoven fabrics of density-gradient type have been proposed as filters having improved maintainability of cleaning efficiency by removing and holding dusts. Nonwoven fabric of density gradient type is nonwoven fabric in which fibrous layers each having a different fibrous density are stacked one over the other in such a manner that the density is varied stepwise in the stacked direction of the fibrous layers. Each fibrous layer is composed of fibers having different fiber diameters. More specifically, the nonwoven fabric of density gradient type is constructed in such a manner that the density of each fibrous layer is increased stepwise in the stacked direction of the fibrous layers from one surface of the nonwoven fabric to the opposite surface thereof by changing the mixing ratio of the fibers composing the fibrous layer with respect to each fibrous layer. In such nonwoven fabric, fibers are bonded to each other by adhesion with a variety of binders, or by adding adhesive fibers and by fusing part of the adhesive fibers so that the fused adhesive fibers are adhered to the other fibers.

Even the abovementioned nonwoven fabric of density-gradient type cannot provide sufficient cleaning efficiency of removing micro particles such as carbon particles. Accordingly, there has been proposed a technique of improving cleaning efficiency by increasing the density of the fibrous layers. Some of the exemplified techniques of increasing the fibrous density are such that the size of the pore (dimension of the clearance) defined by each adjacent fibers is reduced by using fibers having a very small diameter and that the pore size is reduced by impregnating resin in the fibers. In case where such nonwoven fabric is used as a filter, the filter is highly likely to result in clogging of the clearances (pores) in the fibrous layers even if the cleaning efficiency of removing micro particles such as carbon particles is secured. As a result, the life of such a filter is shortened. Furthermore, increasing the density of the fibrous layer may lower retention volume of the filter for trapped dusts and carbon particles, which is resulted in lowering life span of the filter.

In an attempt to solve the above problems, a variety of nonwoven fabrics for filters have been proposed recently. For example, Japanese Unexamined Patent Publication No. HEI 9-192427 discloses the following technique. Specifically, at least two fibrous layers each composed of thermo-adhesive hydrophobic fibers and non-thermal-adhesive hydrophobic fibers are stacked one over the other such that the fibrous layer on an air outlet side has an average fineness smaller than the fibrous layer on an air inlet side. The thus prepared nonwoven fabric is washed with water to reduce the content of oil agent attached to the fibers. Thereby, produced is the nonwoven fabric having improved cleaning performance of trapping sand dusts while suppressing clogging in the fibrous layers by the accumulated dusts.

Japanese Unexamined Patent Publication No. SHO 50-31476 discloses the nonwoven fabric produced by preparing a web containing at least 30% of composite fiber constructed such that fibers made of polymer capable of forming two kinds of fibers with a melting point difference at 20° C. or more are arrayed in a row, subjecting the web to a needle punch processing under a condition where the active barb number ranges from 40 to 150, and subjecting the thus processed web to a thermal treatment at a temperature not lower than a melting point of the low-melting-point component of the composite fiber and lower than the melting point of the high-melting-point component thereof.

The filters for engines of automotive vehicles require high retention volume of dusts, etc., as well as cleaning efficiency of the dusts, etc. considering the demand that the filters be used for a long term. Further, in view of the recent demand for cost reduction, demand for production of nonwoven fabrics capable of providing high cleaning efficiency and high retention volume of dusts, etc. with a less number of fibrous layers and excellent in formability and integral formability has increased.

SUMMARY OF THE INVENTION

In view of the above, it is an object of this invention to provide nonwoven fabrics for filters capable of keeping a high trapping rate with respect to dusts and carbon particles for a long term, with a large retention volume with respect to dusts and carbon particles while suppressing clogging, a process for producing such nonwoven fabrics, and filters for engines using such nonwoven fabrics.

According to an aspect of this invention, the nonwoven fabric is constructed by two or more different kinds of fibrous layers placed one over the other. The nonwoven fabric has an average pore size from 30 $\mu$m inclusive to 60 $\mu$m inclusive and a total pore area at 0.011 cm$^2$/cm$^2$ or more with respect to an entire surface of the nonwoven fabric. The average pore size is calculated according to a bubble point method as defined in ASTM F-316-80 with use of a Coulter Porometer II.

The inventive nonwoven fabric provides excellent initial cleaning efficiency of trapping dusts, particularly, carbon particles, which is required for nonwoven fabrics for filters used in a variety of air cleaner and fluid processing apparatus, particularly, for filters for air-intake engines of automotive vehicles, as well as providing a large retention volume with respect to trapped matters such as dusts and carbon particles. Therefore, the inventive nonwoven fabric is less likely to cause clogging, and can trap a large amount of dusts and carbon particles, and maintain the cleaning efficiency for a long term. Furthermore, the inventive nonwoven fabric provides the excellent cleaning efficiency with such a small number of layers as three and is excellent in formability, which is desirable in the aspect of production cost reduction. The inventive nonwoven fabric is suitable as a filter for an air-intake engine of an automotive vehicle requiring high cleaning performance with a compact size.

DETAILED DESCRIPTION OF THE PREFERRED EMBODIMENTS OF THE INVENTION

As a result of extensive researches and study, the inventors of this application have found that the nonwoven fabrics having the average pore size from 30 to 60 μm and the total pore area at 0.011 cm²/cm² or more produced by placing at least two fibrous layers one over the other provides excellent cleaning efficiency of removing dusts and carbon particles contained in a gas and provides large retention volume of holding the captured dusts and carbon particles.

The average pore size of the nonwoven fabric is the value calculated according to a bubble point method defined in ASTMF-316-80 with use of a Coulter porometer II (product of Coulter, Inc). Measurement by the Coulter porometer II is performed by immersing a piece of nonwoven fabric in a liquid while placing the surface of the nonwoven fabric having a high fibrous density at a lower side of the measuring apparatus and placing the opposite surface thereof having a low fibrous density at an upper side thereof, blowing gas onto the upper surface of the nonwoven fabric while raising the gas pressure, and by measuring the pore size in terms of a relationship between the supplied gas pressure and the surface tension of the liquid exerted on the lower surface (other side) of the nonwoven fabric. Regarding the operating and measuring method of the Coulter porometer II, the staff engaged in the experiments followed the operator's handbook of the measuring apparatus.

It should be appreciated that "the total pore area" is the value calculated with use of the Coulter porometer II and is the total area of the pores per unit area (unit: cm²/cm²) obtained by integrating the areas of the pores having the same diameter with respect to each pore size (diameter) and by summing the results of integration.

If the average pore size exceeds 60 μm, micro particles such as carbon particles easily pass through the pores, thereby failing to provide sufficient initial cleaning efficiency of trapping the micro particles. On the contrary, if the average pore size is smaller than 30 μm, the nonwoven fabric having such an average pore size may likely to cause clogging in a short term although the initial cleaning efficiency of trapping micro particles can be raised. As a result, the nonwoven fabric having such a small average pore size fails to maintain high cleaning efficiency for a long term.

If the total pore area is less than 0.011 cm²/cm², a nonwoven fabric having such a small total pore area cannot provide sufficient retention volume with respect to captured dusts and micro particles such as carbon particles. Preferably, the total pore area is 0.012 cm²/cm² or more, more preferably, 0.013 cm²/cm² or more, and further more preferably, 0.018 cm²/cm² or more. The larger the total pore area is, the more the dusts/carbon particles retention volume of the nonwoven fabric is, thus improving the ability of keeping high cleaning efficiency for a long time. Accordingly, as far as the average pore size lies in the above range, there is no value for the upper limit of the total pore area.

The filter using the inventive nonwoven fabric has an initial cleaning efficiency defined by JIS D 1612 at 95% or more, preferably 96% or more, and a final dusts/carbon particles trapping rate defined by JIS D 1612 at 99.4% or more, preferably 96% or more. The filter also has the retention volume of dusts defined by JIS Z 8901 at 230 g/0.1 m³ or more, and the retention volume of a carbon particle defined by JIS Z 8901 at 3.6 g/0.1 m³ or more. With these properties, the filter can keep high cleaning performance for a long term.

The inventive nonwoven fabric having the above average pore size and total pore area can be produced preferably by placing a plurality of fibrous sheets (webs) each composed of adhesive fibers and fibers to be adhered, which are described below, with these two kinds of fibers being distributed uniformly, one over the other, jointing the fibrous sheets into an integral piece of nonwoven fabric by a physical bonding such as needle punch processing, subjecting the piece of nonwoven fabric to a thermal treatment by thermally adhering the fibers one to another, applying a liquid onto the surface of the nonwoven fabric having a high fibrous density, and by subjecting the nonwoven fabric to a heat roll.

Hereinafter, an exemplified method for producing the inventive nonwoven fabrics for filters is described in detail. As far as the inventive nonwoven fabrics having the above properties are producible, the method for producing the inventive nonwoven fabrics is not limited to the below-mentioned production method.

Preferably, the fiber ingredients constituting each fibrous layer of the inventive nonwoven fabric are such that part of a kind of fiber is fused to adhere to the other fiber to thereby bond together in implementing thermal treatment, which is described later. Bonding the fibers together by utilizing the fused fibers enables to provide a nonwoven fabric having sufficient rigidity against bending in making pleats, which is described later, (hereinafter, this kind of ability of the inventive nonwoven fabric is referred to as "formability") and in forming the nonwoven fabric into an integral nonwoven fabric article with a support frame by making part of the nonwoven fabric to the support frame (hereinafter, this kind of ability of the inventive nonwoven fabric is referred to as "integral formability").

It is needless to say that there is a method for adhering the fibers together by using a known binder such as an emulsion-type binder. However, using the emulsion-type binder involves the following drawbacks. Adding an excessive amount of the binder makes it difficult to control the pore size in a proper range. Furthermore, use of the binder is likely to cause clogging, thereby shortening the life of the filters. In addition, cracks are likely to generate in producing nonwoven fabric articles, thereby producing defective nonwoven fabric articles. In particular, in case of using a binder, integral molding cannot be performed, as will be described later. In view of the above, in the embodiment of this invention, a binder is not used.

In view of the above circumstances, it is preferable to make the fibrous layer of the inventive nonwoven fabric of adhesive fiber and fiber to be adhered.

The adhesive fiber is a fiber having a property of starting melting in the temperature range from 100 to 220° C. Such adhesive fiber may be single fiber or composite fiber. The single fiber includes polypropylene fiber, polyethylene fiber, and copolymer fiber of ethylene-vinylacetate. The composite fiber includes a side by side type or of a sheath and core type. Since excessive melting of fiber lowers bonding strength between fibers, it is preferable to use composite fiber rather than using single fiber. In case of constituting the adhesive fiber of composite fiber, it is recommended to use composite fiber of a sheath and core type composed of a high-melting-point component (corresponding to a core of the fiber) having the melting point higher than the melting point of a low-melting-point component by 30° C. or more, and of the low-melting-point component (corresponding to a sheath of the fiber) having the melting point in the range from 100 to 220° C. Combination of modified polyester and polyester is preferable as such a sheath and core type composite fiber. It is needless to say that such sheath and core type composite fiber includes composite fiber of polypropylene (core) and polyethylene (sheath), composite fiber of 66-nylon (core) and 6-nylon (sheath), and composite fiber of polyester (core) and polyethylene (sheath).

The mixing ratio of the high-melting-point component to the low-melting-point component in the composite fiber is not specifically limited. Fibers available on the market are used as such a composite fiber.

The fiber to be adhered, which is different type of adhesive fiver, is a fiber that does not start melting at the melting start temperature of the above-mentioned adhesive fiber. Preferably, the difference in melting point between the adhesive fiber and the fiber to be adhered is at least 30° C. or more. Preferably, the fiber to be adhered is single fiber. The single fiber includes polyamide fibers such as nylon, and polyester fibers.

The mass ratio of the adhesive fiber to the fiber to be adhered constituting each fibrous layer is preferably in the range from 50:50 to 30:70. The more the ratio of the adhesive fiber is, the pores may be clogged or the total pore area may be reduced owing to excessive melting of the adhesive fiber. It should be appreciated that the length of each fiber is not specifically limited. Known fibers of any fiber length may be used.

According to the embodiment of this invention, a fibrous layer is producible according to a known process as far as the mixing ratio of the adhesive fiber to the fiber to be adhered lies in the above range. The inventive nonwoven fabric is obtained by placing at least two fibrous layers each of which is made by mixing the above-mentioned fibers at the specified ratio, one over the other. As far as the above average pore size and the above total pore area are obtainable, the thickness of the nonwoven fabric, the thickness of each fibrous layer, and the number of fibrous layers composing the nonwoven fabric are not limited. Therefore, the thickness and the number of fibrous layers can be determined optimally according to its purpose of use. However, increasing the thickness and the number of fibrous layers beyond an allowable range may raise the production cost of the nonwoven fabric. Accordingly, it is preferable to regulate the density of the fibrous layer and the diameter of fibers in such a manner that the average pore size and the total pore area as defined in the above can be obtained with a less number of fibrous layers.

According to the embodiment of this invention, it is preferable to constitute the nonwoven fabric in such a manner that the density of the fibrous layer increases stepwisely or continuously in the stacked direction of the fibrous layers from a supply-gas-inlet side of the nonwoven fabric through which a supply gas is drawn in to a supply-gas-outlet side thereof through which the supply gas is discharged. Hereinafter, the fibrous layer having a high fibrous density is referred to as "high-density layer", and the fibrous layer having a low fibrous density is referred to as "low-density layer". In the nonwoven fabric having such a density gradient, particles having a relatively large diameter such as dusts can be trapped in the supply-gas-inlet-side fibrous layer (namely, low-density layer). Thereby, clogging in the supply-gas-outlet-side fibrous layer (namely, high-density layer) can be suppressed. Furthermore, in this arrangement, dusts can be retained in such a manner that the dusts of different particle sizes (diameters) are distributed in the thickness direction (stacked direction) of the nonwoven fabric according to the size of the particles. With this arrangement, the retention volume of dusts per unit area can be increased.

It is preferable to use fiber having a small average denier as a component for the high-density layer in order to raise the fibrous density of the high-density layer while suppressing the layer thickness as much as possible. Furthermore, it is preferable to use fiber having a large average denier as a component for the low-density layer to satisfy the requirement to trap particles of a relatively large size. In view of this, it is preferable to reduce the average denier of the fibrous layers stepwisely or continuously in the thickness direction or stacked direction of the nonwoven fabric from the supply-gas-inlet side (low-density layer side) to the supply-gas-outlet side (high-density layer side).

A process for jointing the stacked fibrous layers to produce present inventive nonwoven fabric is not specifically limited. However, integral formation by physical bonding is preferred to chemical bonding to secure formability of the nonwoven fabric. Physical bonding means that the fibrous layers are jointed together by intertwining the fibers in the adjacent layers. Preferable exemplified methods of intertwining the fibers according to such a physical bonding are needle punch processing and water-jet processing. Regarding the physical bonding such as needle punch processing and water-jet processing, it is desirable to perform needle punch processing (water-jet processing) on the high-density layer side of the nonwoven fabric for the following reasons. Compared to the case where needle punch processing is performed on the low-density layer side, needle punch processing on the high-density layer side can suppress collapse or deformation of the pores accompanied by intertwining as well as undesirably widening the pore size. With this arrangement, the average pore size and the total pore area defined above can be secured, thereby suppressing lowering of the initial cleaning efficiency with respect to micro particles such as carbon particles. The requirements for performing needle punch processing are not specifically limited. However, excessively increasing the needle depth may undesirably widen the pore size (diameter). On the contrary, excessively reducing the needle depth cannot attain sufficient intertwining. In view of this, generally, it is preferable to set the needle depth in the range from 8 to 15 mm. Any kind of needle used in the known needle punch processing can be used as a needle for the needle punching in this invention. However, since the needle diameter is larger than the diameter of the pores in the high-density layer, the pore diameter in the high-density layer may increase by the needle punch processing. In view of this, it is preferable to set the number of needles (the number for penetration) per unit area in the range from 40 to 100 pieces/cm$^2$ in order to suppress undesirable widening of the pore diameter and to perform sufficient intertwining operation.

The nonwoven fabric after the physically bonding is subjected to a heat treatment in which the adhesive fiber and the fiber to be adhered are adhered together. The thermal treating method is not specifically limited. As far as the temperature for the thermal treatment is equal to or higher than the melting start temperature of the adhesive fiber and lower than the melting start temperature of the fiber to be adhered, these fibers can be adhered to each other.

The surface of the high-density layer after the heat treatment is likely to be fuzz state. In view of this, after the thermal treatment, a calendar processing is performed in which the high-density layer of the nonwoven fabric contacts a heat roller heated at a temperature equal to or higher than the melting start temperature of the low-melting-point component of the fiber in order to make the surface configuration smooth, secure certain dimensions for the nonwoven fabric, and to raise the fibrous density. Contacting the heat roller with the surface of the high-density layer in the calendar processing enables to provide a desired surface state by adhesion of the fuzz fibers in the high-density layer and raises the fibrous density of the high-density layer surface.

Contact of the heat roller with the surface of the high-density layer in the calendar processing may likely to fuse the adhered part of the adhesive fiber and the fiber to be adhered (of course other adhered part such as adhered part of the adhesive fiber and the adhesive fiber is fused). Then, the fused part may cause re-adhesion of the fibers. Since the surface of the high-density layer is brought to a pressed state by the roller, excessive adhesion may be caused, or the fuzz fibers that have been attached to the roller surface may adhere to the fibers on the high-density layer surface. As a result of these actions, contact of the heat roller with the high-density layer surface in the calendar processing may result in reducing of the pore diameter, reducing of the number of the pores, or clogging of the pores on the high-density layer surface, or may undesirably widen the pore diameter by re-adhesion of the fibers. Since the nonwoven fabric that has undergone such a treatment has a reduced total pore area, using such a nonwoven fabric as a filter as it is cannot provide sufficiently large retention volume of dusts, particularly, carbon particles, as will be described below.

In order to solve the above problem, it is preferable to apply a liquid onto the high-density layer surface prior to the calendar processing. Applying a liquid onto the high-density layer surface allows vaporized micro particles of the liquid generated by heating of the liquid to adhere on the fibers constituting the high-density layer surface. Adhesion of the vaporized micro particles of the liquid blocks reducing of the pore diameter, reducing of the pore number, and clogging of the pores resulting from fusion of the adhered part of the adhesive fiber and the fiber to be adhered, re-adhesion, and adhesion of the fuzz fibers to the other fibers such as the fibers to be adhered accompanied by fusing. The nonwoven fabric that has undergone the above liquid application and the calendar processing in this order after the thermal treatment is provided with a proper surface state while keeping desirably high fibrous density on the high-density layer surface with the pore size in the defined range. Furthermore, such nonwoven fabric is substantially free from decrease of the total pore area with respect to the entire surface of the nonwoven fabric. Accordingly, such nonwoven fabric provides large retention volume of captured dusts and carbon particles. Application of liquid secures and/or forms a multitude of micro air passages (air channels) in the nonwoven fabric, thus maintaining high cleaning efficiency for dusts and carbon particles for a long term.

The liquid used in the liquid application is not specifically limited. An oil agent such as water and an electrostatic inhibitor is preferable. In case of using an oil agent, it is preferable to use the oil agent in the form of solution. The concentration of the oil solution is preferably in the range from 0.05 to 10 mass %, and more preferably, in the range from 0.1 to 5 mass %.

The liquid may be applied according to any desired manner such as coating or spraying, as far as the liquid can be contacted the high-density layer surface of the nonwoven fabric. Spraying is desirable in order to uniformly apply the liquid onto the high-density layer surface.

The amount of the liquid for application can be optimally regulated according to the temperature of the heat roller in the calendaring process. The amount for liquid application when the temperature of the heat roller is set in the below-mentioned range is preferably from 1 to 20 g/m$^2$, and more preferably from 2 to 10 g/m$^2$. Applying the liquid beyond the upper limit of the allowable range cannot provide a sufficient effect borne from the liquid application. Applying the liquid below the lower limit of the allowable range needs to set the temperature of the heat roller high in order to secure the aforementioned effect. However, raising the temperature of the heat roller, which is contacted with the high-density layer surface, may cause fusion and re-adhesion of the fibers composing the high-density layer of the nonwoven fabric even if the liquid is applied to the surface of the high-density layer as mentioned above. This is not desirable because the heat transfer from the heat roller may clog the pores of the high-density layer.

The temperature of the heat roller is not specifically limited. Preferably, the temperature of the heat roller in contact with the high-density layer surface is equal to or higher than the melting start temperature of the adhesive fiber and lower than the melting start temperature of the adhered fiber, e.g., in the range from 190 to 230° C. There is no requirement regarding the pore size and the surface condition of the low-density layer surface. Accordingly, the temperature of the roller in contact with the lower-density layer surface may be an ambient temperature. In other words, there is no need of heating the roller in contact with the lower-density layer surface.

The interval between the rollers (clearance between the rollers) is not specifically limited. The clearance can be optimally changed according to needs.

Implementing the above steps enables to produce the inventive nonwoven fabric for a filter having the average pore size in the range from 30 to 60 μm and the total pore area at 0.011 cm$^2$/cm$^2$ or more.

The thus produced nonwoven fabric can be used as a filter by cutting the nonwoven fabric into a proper shape according to the configuration of the parts to which the filter is to be applied. It is desirable to apply various processes, such as pleating process, to the nonwoven fabric. Particularly, in case of using the nonwoven fabric as a filter for use in an engine of a vehicle such as an automotive vehicle, it is preferable to perform pleating process in the aspect of maintaining cleaning performance of the filter and securing the cleaning efficiency. Pleating may be performed according to a known method.

Further, a support frame (flange portion) of the filter may be integrally formed by subjecting part of the filter to compression molding after subjecting the filter to a pleating process. Since a binder is not used in bonding the fibers of the inventive nonwoven fabric, there is no likelihood that cracks may be generated in the filter in forming the support frame as integral part.

A method of the integral formation is not specifically limited. An exemplified method is such that the nonwoven fabric after the pleating process is placed on a mold of a press machine. Then, the mold on which the nonwoven fabric is placed is brought to a pressing contact with a counterpart mold that has been heated at a temperature lower than a temperature of fusing the adhered fibers of the nonwoven fabric. Then, the four outer sides of the nonwoven fabric are compressed to form a flange portion. In this way, the support frame of the nonwoven fabric is integrally molded with the nonwoven fabric after the pleating process.

In other words, the inventive nonwoven fabric provides easy molding by fusing of the bonded parts of the fibers with heat and by re-adhesion of the fibers in a cooling process that follows the molding process, thus providing a reinforced support frame. The molding method disclosed in Japanese Unexamined Patent Publication No. HEI 8-309136 is applicable as an exemplified molding method in this invention. Since a support frame can be integrally molded by utilizing part of a filter made of the nonwoven fabric, there is no need of using an additional parts such as a frame made of a rubber. Accordingly, the inventive filter can be produced with reduced cost.

Hereinafter, examples of the inventive nonwoven fabric are described referring to Table 1. "l-m-p-polyester" in Table 1 means low-melting-point polyester.

TABLE 1

| Layered member | Layer construction | Fiber | | | | | Nonwoven fabric | |
|---|---|---|---|---|---|---|---|---|
| | | Kind of fiber | Melting point (° C.) | Denier | Fiber length | Mixing ratio | Metsuke (g/m²) | Average denier |
| No. 1 | outlet-side layer | polyester | 260 | 1.25 | 44mm | 50% | 170 | 1.625 |
| | | polyester/l-m-p-polyester | 160 | 2 | 51mm | 50% | | |
| | middle layer | polyester | 260 | 2 | 51mm | 50% | 90 | 3.0 |
| | | polyester/l-m-p-polyester | 160 | 4 | 51mm | 50% | | |
| | inlet-side layer | polyester | 260 | 6 | 51mm | 50% | 60 | 5.0 |
| | | polyester/l-m-p-polyester | 160 | 4 | 51mm | 50% | | |
| No. 2 | outlet-side layer | polyester | 260 | 1.25 | 44mm | 30% | 170 | 1.78 |
| | | polyester/l-m-p-polyester | 160 | 2 | 51mm | 70% | | |
| | middle layer | polyester | 260 | 2 | 51mm | 70% | 90 | 2.6 |
| | | polyester/l-m-p-polyester | 160 | 4 | 51mm | 30% | | |
| | inlet-side layer | polyester | 260 | 6 | 51mm | 70% | 60 | 5.4 |
| | | polyester/l-m-p-polyester | 160 | 4 | 51mm | 30% | | |
| No. 3 | outlet-side layer | polyester | 260 | 1.25 | 44mm | 50% | 90 | 1.625 |
| | | polyester/l-m-p-polyester | 160 | 2 | 51mm | 50% | | |
| | middle layer | polyester | 260 | 2 | 51mm | 50% | 170 | 3.0 |
| | | polyester/l-m-p-polyester | 160 | 4 | 51mm | 50% | | |
| | inlet-side layer | polyester | 260 | 6 | 51mm | 50% | 60 | 5.0 |
| | | polyester/l-m-p-polyester | 160 | 4 | 51mm | 50% | | |
| No. 4 | outlet-side layer | polyester | 260 | 1.25 | 44mm | 25% | 170 | 1.738 |
| | | polyester/l-m-p-polyester | 160 | 1.7 | 44mm | 25% | | |
| | | polyester/l-m-p-polyester | 160 | 2 | 51mm | 50% | | |
| | middle layer | polyester | 260 | 2 | 51mm | 50% | 90 | 3.0 |
| | | polyester/l-m-p-polyester | 160 | 4 | 51mm | 50% | | |
| | inlet-side layer | polyester | 260 | 6 | 51mm | 50% | 60 | 5.0 |
| | | polyester/l-m-p-polyester | 160 | 4 | 51mm | 50% | | |

EXAMPLES

Example 1

In Example 1, the combination of fibrous layers represented as layered member No. 1 in Table 1 was used. The composition of the layered member No. 1 is as follows.

Composition of High-Density Layer:

fibrous layer containing 170 g/m² of "metsuke" (average fineness: 1.625 denier) made of 50 mass % of polyester fiber (fineness: 1.25 denier, fiber length: 44 mm, melting point: 260° C.), and 50 mass % of composite fiber made of polyester and low-melting-point polyester (fineness: 2 denier, fiber length: 51 mm, melting point of low-melting-point polyester: 160° C.)

Note: "metsuke" is weight of fiber per unit area

Composition of Middle Layer:

fibrous layer containing 90 g/m² of metsuke (average fineness: 3.0 denier) made of 50 mass % of polyester fiber (fineness: 2 denier, fiber length: 51 mm, melting point: 260° C.), and 50 mass % of composite fiber made of polyester and low-melting-point polyester (fineness: 4 denier, fiber length: 51 mm, melting point of low-melting-point polyester: 160° C.)

Composition of Low-Density Layer:

fibrous layer containing 60 g/m² of metsuke (average fineness: 5.0 denier) made of 50 mass % of polyester fiber (fineness: 6 denier, fiber length: 51 mm, melting point 260° C.), and 50 mass % of composite fiber made of polyester and low-melting-point polyester (fineness: 4 denier, fiber length: 51 mm, melting point of low-melting-point polyester: 160° C.)

The above fibrous layers were placed one over the other in the order of the high-density layer, the middle layer, and the low-density layer, and a needle punch processing (needle depth: 11 mm, number of needles 63 pieces/cm²) was applied on the stacked layer from the side of the high-density layer. After a thermal treatment (210° C., 47 seconds) by a pin tenter type heat processing machine, water was sprayed onto the surface of the high-density layer (water amount of 10 g/m²). Subsequently a calendar processing was performed by rendering the high-density layer in contact with a heat roller having a surface temperature at 215° C. and rendering the low-density layer in contact with a roller of an ambient temperature with a clearance between the rollers at 2.5 mm. After the calendar processing, the stacked layers were air-cooled. Thus, a piece of nonwoven fabric for a filter was produced.

Example 2

A piece of nonwoven fabric for a filter was produced in the same manner as Example 1 except that 10 g/m² of an electrostatic inhibitor of anion type (2 mass %) was sprayed onto the surface of the high-density layer in place of water.

Example 3

In Example 3, the combination of fibrous layers represented as layered member No. 2 in Table 1 was used. The composition of the layered member No. 2 is as follows.

Composition of High-Density Layer:

fibrous layer containing 170 g/m² of metsuke (average fineness: 1.78 denier) made of
  30 mass % of polyester fiber (fineness: 1.25 denier, fiber length: 44 mm, melting point: 260° C.) and
  70 mass % of composite fiber made of polyester and low-melting-point polyester (fineness: 2 denier, fiber length: 51 mm, melting point of low-melting-point polyester: 160° C.)

Composition of Middle Layer:

fibrous layer containing 90 g/m² of metsuke (average fineness: 2.6 denier) made of
  70 mass % of polyester fiber (fineness: 2 denier, fiber length: 51 mm, melting point: 260° C.), and
  30 mass % of composite fiber made of polyester and low-melting-point polyester (fineness: 4 denier, fiber length: 51 mm, melting point of low-melting-point polyester: 160° C.)

Composition of Low-Density Layer:

fibrous layer containing 60 g/m² of metsuke (average fineness: 3.0 denier) made of
  70 mass % of polyester fiber (fineness: 6 denier, fiber length: 51 mm, melting point: 260° C.), and
  30 mass % of composite fiber made of polyester and low-melting-point polyester (fineness: 4 denier, fiber length: 51 mm, melting point of low-melting-point polyester: 160° C.)

A piece of nonwoven fabric for a filter was produced in the same manner as Example 1 except that the above fibrous layers were used.

Example 4

A piece of nonwoven fabric for a filter was produced in the same manner as Example 1 except that water was not sprayed onto the high-density layer.

Example 5

A piece of nonwoven fabric for a filter having the composition as shown by layered member No. 3 in Table 1 was produced in the same manner as Example 4 except that 90 g/m² of metsuke was used for composing the high-density layer and 170 g/m² of metsuke was used for composing the middle layer.

Example 6

A piece of nonwoven fabric for a filter having the composition as shown by layered member No. 4 in Table 1 was produced in the same manner as Example 4 except that a fibrous layer containing 170 g/m² of metsuke (average fineness: 1.738 denier) having the following composition was used as the high-density layer.

Composition of High-Density Layer:

25 mass % of polyester fiber (fineness: 1.25 denier, fiber length: 44 mm, melting point: 260° C.),
  25 mass % of composite fiber made of polyester and low-melting-point polyester (fineness: 2 denier, fiber length: 44 mm, melting point of low-melting-point polyester: 160° C.) and
  50 mass % of composite fiber made of polyester and low-melting-point polyester (fineness: 1.7 denier, fiber length: 51 mm, melting point of low-melting-point polyester: 160° C.)

It should be appreciated that the above composition of the high-density layer was prepared to reduce the number of contact points among fibers.

The properties of the nonwoven fabrics obtained in Examples 1 to 6 were examined with respect to the following items. The supply gas was drawn through the low-density layer of each nonwoven fabric and discharged out of the high-density layer thereof. The results of the examinations are shown in Table 2.

<Items to be Examined> average pore size (unit: μm): calculated by a Coulter Porometer II (product of Coulter, Inc.) in a state that the supply-gas-inlet side of each nonwoven fabric, namely, the low-density layer surface was placed upward and according to a bubble point method defined in ASTMF-361-80 total pore area (unit: cm²/cm²): calculated by the Coulter Porometer II (product of Coulter, Inc.) in a state that the supply-gas-inlet side of each nonwoven fabric, namely, the low-density layer surface was placed upward and according to a bubble point method defined in ASTMF-361-80, wherein the total pore area was calculated by integrating the areas of the pores having the same diameter with respect to each pore size (diameter) and by summing the results of integration

| | |
|---|---|
| metsuzke (unit: g/m²): | measured according to JIS L1906 4.2 |
| thickness (unit:mm): | measured according to JIS L1906 4.2 in a state that a load of 2KPa was applied onto each piece of nonwoven fabric |
| cleaning efficiency (initial trapping rate & final trapping rate): | calculated according to JIS D1612 at a test wind velocity of 60 m/sec and in a state that powder defined as No. 8 in JIS Z8901 was applied onto each piece of nonwoven fabric |
| ΔP (unit:Pa): | measured according to JIS D 1612 |
| dust retention volume (g/0.1m³): | measured according to JIS D 1612 |

-continued

| | |
|---|---|
| carbon retention volume (g/0.1m³): | measured according to JIS D 1612 |
| formability: | formability in forming a frame by heat-pressing the outer peripheral portion of the pleated nonwoven fabric |

TABLE 2

| | unit | Ex 1 | Ex 2 | Ex 3 | Ex 4 | Ex 5 | Ex 6 |
|---|---|---|---|---|---|---|---|
| average pore size | µm | 44.7 | 48.2 | 43.6 | 48.7 | 47.8 | 56.3 |
| total pore area | cm²/cm² | 0.0184 | 0.0132 | 0.0132 | 0.0097 | 0.0099 | 0.0107 |
| metsuke | g/m² | 322 | 312 | 302 | 327 | 313 | 370 |
| thickness | mm | 5.5 | 5.5 | 4.4 | 5.5 | 4.6 | 4.3 |
| ΔP | Pa | 112 | 118 | 125 | 127 | 117 | 131 |
| initial trapping rate | % | 97.9 | 97.7 | 97.4 | 97.2 | 96.0 | 98 |
| final trapping rate | % | 99.7 | 99.6 | 99.4 | 99.7 | 99.5 | 99.6 |
| dust retention volume | g/0.1 m³ | 242 | 241.4 | 235 | 225 | 164 | 152 |
| carbon retention volume | g/1.0 m³ | 3.77 | 3.7 | 3.6 | 2.9 | 2.8 | 2.0 |
| formability | | good | good | good | good | fair | fair |

The following is an analysis about the results of the examination.

In Example 1, prior to the calendar processing, water was applied on the high-density layer surface of the nonwoven fabric. Application of water vapor could suppress clogging of the pores and deformation of the pores such as reduced dimensions of the pores. As a result, a sufficiently large total pore area of the nonwoven fabric could be secured, and a proper pore size could be obtained. On the contrary, in Example 4 where water was not applied prior to the calendar processing, some of the pores were clogged after the calendar processing, and the pores that have not been clogged increased their sizes with the result that the total pore area was reduced. Comparing Example 1 and Example 4, Example 1 was superior to Example 4 in pressure loss, initial trapping rate of dusts and carbon particles as well as dust retention volume and carbon retention volume.

In Example 2, prior to the calendar processing, a solution containing an oil agent was applied to the high-density layer surface in place of water. The average pore size of the nonwoven fabric in Example 2 is generally the same as that in Example 4. However, the nonwoven fabric in Example 2 showed less clogging and deformation of pores such as decreased dimensions of the pores after the calendar processing compared with Example 4 because the oil solution was applied in Example 2. Also, the nonwoven fabric in Example 2 could attain a large total pore area with the result that the nonwoven fabric in Example 2 could provide less pressure loss, high initial trapping rate, and large dust and carbon particles retention volume.

In Example 3, the content of the low-melting-point component of the adhesive fibers constituting the high-density layer was increased. As a result, the average pore size was relatively small and the pore size was somewhat small due to thermal pressing in the calendar processing. However, since the calendar processing was performed after applying water in Example 3, clogging of the pores was suppressed and the same level of the total pore area as Example 2 could be secured. Comparing Example 3 and Example 4, Example 3 provided large dust and carbon particle retention volume than Example 4.

In Example 5, the content of the fibers constituting the high-density layer was reduced. As a result, the total pore area did not reach the defined range, and the dust and carbon particle retention volume were small although the average pore size was relatively large.

In Example 6, an attempt was made to maintain the average pore size in the defined range and to secure a large total pore area by controlling the adhesion between the fibers constituting the high-density layer. However, Example 6 failed to obtain a sufficiently large total pore area because water/oil solution was not applied prior to the calendar processing. The nonwoven fabric in Example 6 failed to provide sufficiently large dust retention volume and carbon retention volume.

As is obvious from the Examples, the nonwoven fabrics produced by placing at least two fibrous layers one over the other satisfying the requirements of the average pore size from 30 to 60 µm and the total pore area at 0.011 cm²/cm² or more provide satisfactory cleaning performances required for filters.

As a result of examining formability of the nonwoven fabrics, the nonwoven fabrics in Examples 1 to 4 passed the formability requirement. However, the nonwoven fabrics in Examples 5 and 6 were inferior because there was found uneven pleated portions at an end portion or a corner end portion of the nonwoven fabric.

To sum up this invention, according to an aspect of this invention, a nonwoven fabric for a filter is constructed by two or more different kinds of fibrous layers placed one over the other, and has an average pore size from 30 µm inclusive to 60 µm inclusive and a total pore area at 0.011 cm²/cm² or more with respect to an entire surface of the nonwoven fabric. The average pore size is calculated according to a bubble point method as defined in ASTM F-316-80 with use of a Coulter Porometer II.

Preferably, each fibrous layer is composed of adhesive fibers and fibers to be adhered.

According to another aspect of this invention, the fibrous layers are placed one over the other in such a manner that a fibrous density of the layer increases stepwisely or continuously, and an average denier of fibers composing the fibrous layer decreases stepwisely or continuously.

Preferably, the fibrous layers are placed one over the other by a physical bonding. The physical bonding is preferably obtained by intertwining the fibers composing the fibrous layers. The physical bonding is preferably a needle punch processing or a water jet processing.

Although the process for producing the inventive nonwoven fabric is not specifically limited, the following process is preferable. Specifically, the process comprises the steps of placing two or more different kinds of fibrous layers one over the other, the fibrous layer being composed of fibers mixed at a certain ratio; subjecting the fibrous layers to a physical bonding by intertwining the fibers; subjecting the fibrous layers to a thermal treatment while fusing part of the fibers for adhesion to compose a multi-layered member of a certain shape; applying a liquid to a surface of the multi-layered member having a larger fibrous density than the opposite surface of the multi-layered member; and performing a calendar processing to the multi-layered member by processing the member through a gap between a pair of rollers, especially by allowing the one surface of the multi-layered member into contact with the roller (first roller) heated at a certain temperature, while at the same time allowing the opposite surface thereof into contact with a counterpart roller(second roller) at an ambient temperature. That is, the multi-layered member is processed by the rollers under the condition that the temperature of the first roller is higher than the temperature of the second roller.

It should be appreciated that all the inventive nonwoven fabrics mentioned above are suitable as filters for air-intake engines of automotive vehicles.

As this invention may be embodied in several forms without departing from the spirit of essential characteristics thereof, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A process for manufacturing a nonwoven fabric for a filter excellent in cleaning efficiency and trapped matter retention volume constructed by two or more different kinds of fibrous layers placed one over the other, the nonwoven fabric having an average pore size from 30 μm inclusive to 60 μm inclusive and a total pore area at 0.011 $cm^2/cm^2$ or more with respect to an entire surface of the nonwoven fabric, the average pore size being calculated according to a bubble point method as defined in ASTM F-316-80 with use of a Coulter Porometer II, said process comprising:

placing two or more fibrous layers differing in density one over the other, each fibrous layer being composed of adhesive fibers and fibers to be adhered to said adhesive fibers, mixed at a certain ratio;

subjecting the fibrous layers to a physical bonding by intertwining the fibers;

subjecting the fibrous layers to a thermal treatment while fusing part of the fibers for adhesion to compose a multi-layered member of a certain shape;

applying a liquid to a surface of the multi-layered member, the surface having a larger fibrous density than the opposite surface of the multi-layered member; and performing a calendar processing to the multi-layered member by allowing the one surface of the multi-layered member into contact with a first roller heated at a certain temperature, while allowing the opposite surface thereof into contact with a counterpart second roller at an ambient temperature, the temperature of the first roller being higher than the temperature of the second roller.

2. The process for manufacturing the nonwoven fabric according to claim 1, wherein the fibrous layers are placed one over the other in such a manner that a fibrous density of the layer increases step-wisely or continuously in a thickness direction of the nonwoven fabric from a surface of the nonwoven fabric to the opposite surface thereof.

3. The process for manufacturing the nonwoven fabric according to claim 1, wherein the fibrous layers are placed one over the other in such a manner that an average denier of fibers composing the fibrous layer decreases step-wisely or continuously in a thickness direction of the nonwoven fabric from a surface of the nonwoven fabric to the opposite surface thereof.

4. The process for manufacturing the nonwoven fabric according to claim 1, wherein the physical bonding is obtained by a needle punch processing or a water jet processing.

5. The process for manufacturing the nonwoven fabric according to claim 1, wherein the temperature of the first roller is in the range from 190° C.–230° C.

6. The process for manufacturing the nonwoven fabric according to claim 1, wherein the liquid is water or oil agent.

* * * * *